United States Patent
Britton

(10) Patent No.: US 6,413,467 B1
(45) Date of Patent: Jul. 2, 2002

(54) RELATING TO CONTAINERS

(76) Inventor: Charles Jonathan Britton, 19 High Street, Avening, Tetbury, Gloucestershire (GB), GL8 8NF ( * ) Notice: Subject to any disclaimer, the term of this patent is extended or adjusted under 35 U.S.C. 154(b) by 0 days.

(21) Appl. No.: 09/077,515

(22) PCT Filed: Nov. 29, 1996

(86) PCT No.: PCT/GB96/02939
§ 371 (c)(1),
(2), (4) Date: Mar. 19, 1999

(87) PCT Pub. No.: WO97/19806
PCT Pub. Date: Jun. 5, 1997

(30) Foreign Application Priority Data

Nov. 30, 1995 (GB) ............................................. 9524456

(51) Int. Cl.$^7$ .............................. B29C 49/06; B65D 1/02
(52) U.S. Cl. ........................ 264/537; 264/533; 215/40; 215/42; 215/43
(58) Field of Search ................. 264/537, 533, 264/318; 425/525; 215/40, 42, 43

(56) References Cited

U.S. PATENT DOCUMENTS

| | | | |
|---|---|---|---|
| 3,482,724 A | * 12/1969 | Heaton | 215/10 |
| 3,900,120 A | * 8/1975 | Sincock | 428/542.8 |
| 4,367,821 A | 1/1983 | Holt | 220/72 |
| 4,941,815 A | * 7/1990 | Julian | 425/525 |
| 5,117,993 A | * 6/1992 | Vesborg | 215/382 |
| 5,266,257 A | 11/1993 | Kildune | 264/224 |
| 5,269,427 A | * 12/1993 | Hurd | 215/31 |

FOREIGN PATENT DOCUMENTS

| | | |
|---|---|---|
| AU | 522 005 | 5/1982 |
| EP | 0 329 883 | 8/1989 |

* cited by examiner

Primary Examiner—Suzanne E. McDowell
(74) Attorney, Agent, or Firm—Foley & Lardner

(57) ABSTRACT

A container is made in two stages from material such as thermoplastics that is deformable when heated. In the first stage a preform (1) is injection moulded, the mould parts easily releasing a tubular body (2) with a closed end and an outwardly projecting rim (3) at the open end. On or in the surface of the rim facing away from the body there is a formation such as a spiral rib (5) or groove. In the second stage the still heated preform (1) is blow moulded, possibly with some preliminary mechanical stretching, with the blow pin (9) seated in the open end of the body (2) and the preform held by the outer part (7) of its rim. The wall of the body (2) is expanded and the inner part (4) of the rim is urged away from the blow pin (9), deforming into a short tubular mouth with the formation (5) facing inwards. A spiral becomes a screw thread for receiving a screw-in cover.

14 Claims, 1 Drawing Sheet

RELATING TO CONTAINERS

Figure 1:
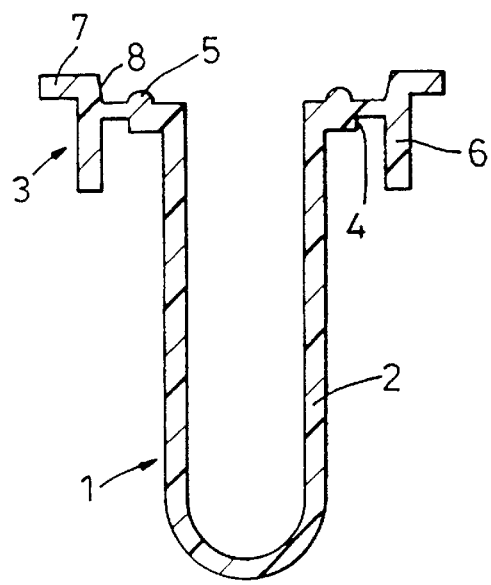

This invention relates to containers and is primarily concerned with those which have closure members which fit inside an opening and which can be turned to lock in place.

This requires an internal thread or some form of undercut, and with a moulded construction there are consequently manufacturing problems which are costly and difficult to overcome. Indeed they are sometimes considered impossible. Tool costs are high, and one either has to arrange for unscrewing a core from the newly formed thread or undercut or else collapsing the core sufficiently to permit its withdrawal. It has been attempted simply to pull the core out directly, forcing the plastics aside, but this often damages the plastics.

It is the aim of this invention to enable such a container to be manufactured more easily.

According to one aspect of the present invention there is provided a method of making a container to which entry is via an opening having a detent for positively retaining a closure member within that opening, the material of the container being susceptible to deformation when heated, wherein in a first stage an embryo container is formed with a surface which is to provide the inside of the opening exposed and facing outwardly, the detent being simultaneously formed on or in said surface, and wherein in a second stage the material defining the opening is deformed, at an elevated temperature, to transform said surface from an outwardly facing one into a passage providing the opening with the detent.

It will be assumed hereafter that both the embryo and finished container are in an upright attitude with the opening uppermost.

The formation of the embryo container in the first stage is conveniently by injection moulding using an inner mould core which is subsequently extractable through said opening, while the transformation from embryo to finished container in the second stage is preferably by blow moulding via the opening, although at least some of the distortion or stretching inherent in the process could be achieved mechanically.

The detent in the embryo container may be a spiral or part-spiral to form screw threading in the finished container. Alternatively, the detent could be at least one L-shaped indentation to form the female part of a bayonet fitting, or at least one stud to form the male part of a bayonet fitting. In another version, the detent is an annular ring formation to retain a ball, as used for roll-on deodorants for example.

In the preferred form, the material to define the opening is initially a generally radial flange at the mouth of a closed end tube, and said surface is the upper one of that flange. There may also be a generally cylindrical flange at the periphery of the radial flange projecting downwardly to surround the opening end of the tube. In the second stage, the radial flange is deformed downwards into a generally cylindrical configuration so that its under surface faces outwardly to co-operate with the inside of the cylindrical flange. In the finished container they bond together. The spiral (if that is the detent) becomes a screw thread on the inside of the opening.

With this arrangement, and if the material of the container is transparent, a data band can be provided on the inside of the cylindrical flange of the embryo container to be legible therethrough, the band being made captive by the deformed radial flange.

Conveniently, there is a rim projecting beyond the radial and cylindrical flanges, its underside providing means for locating the embryo container during the blow moulding while its inside provides a seat for a blow pin.

According to another aspect of the invention there is provided a container made by the method outlined above.

Figure 2:
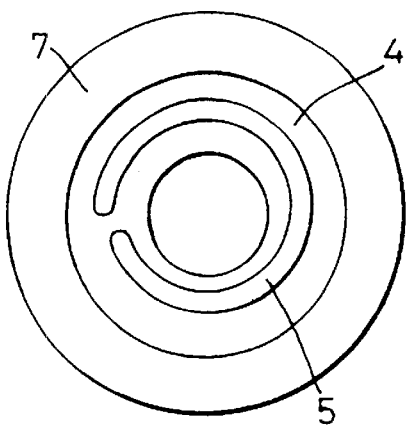
Figure 3:
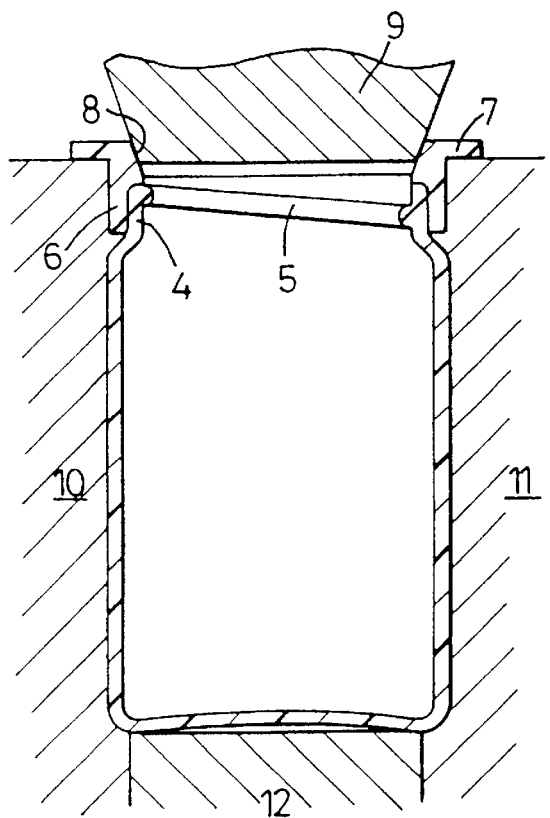
Figure 4:
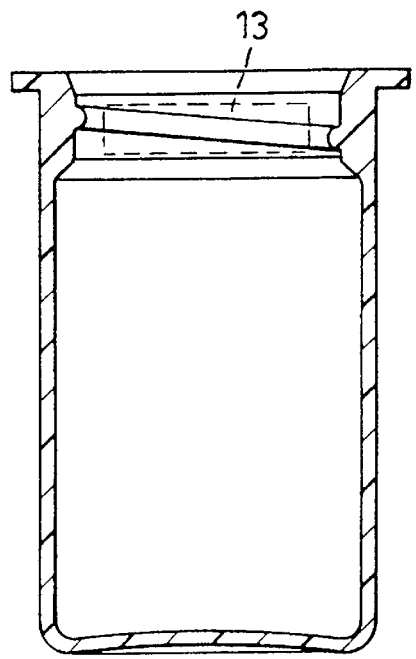

For a better understanding of the invention, one embodiment will now be described, by way of example, with reference to the accompanying drawing, in which:

FIG. 1 is an axial section of a preform of a container with a blow pin in position, FIG. 2 is a plan view of the preform, FIG. 3 is an axial section of a container in a mould having been expanded by blow moulding from the preform of FIG. 1, and FIG. 4 is an axial section of the finished, released container.

A preform 1 or embryo container is of plastics material made by injection moulding. Its shape is such that it will simply require two mould parts which can be parted axially to release the preform when it has set. There are no undercuts to complicate the mould.

In more detail, the preform has a test-tube like body 2 and an outwardly extending ring 3 at the mouth of the body 2. This ring includes a radial flange 4 stepped on the underside to be thicker over the radially inner annular portion, and having a spiral rib 5 on its upper face. At the outer periphery of the flange 4 there is a further, cylindrical flange 6 projecting downwardly to form a skirt around the upper portion of the body 2. Above this a rim 7 steps upwardly and outwardly, having a slightly coned inner surface 8. This provides a seat for a blow pin 9.

After injection moulding, the body is transferred to a blow mould while still hot. The blow mould comprises two halves 10 and 11 and a base insert or punt 12. The rim 7 rests on the edge of the cavity formed by the halves 10 and 11 and the flange 6 fits snugly in the mouth of that cavity. These parts are cooled quicker than the rest and so solidify enough to provide firm support and location. The blow pin 9 seals against the surface 8, its end face just above the spiral rib 5 so that the upper face of the flange will be subject to pressurised air introduced during blow moulding. The contact of the blow pin with the plastics material contributes to the local cooling and solidification. With the preform thus trapped, air under pressure is introduced to expand the still soft remainder of the body 2. During this expansion, the flange 4 will be forced down about its junction with the flange 6 and rim 7 so that it becomes generally cylindrical, being urged against the inside of the flange 6. It then flows around the underside of that flange 6 to meet the wall of the blow mould cavity. The rest of the body 2 expands as shown in FIG. 3, and when the material has cooled, the mould parts are separated and the completed container as shown in FIG. 4 is released. The heat is such that where two plastics surfaces have been urged together, they become effectively homogeneous.

During this process, the spiral rib 5 has become a screw thread, projecting into the mouth of the container.

The transformation of the flange 4 from its initial to its cylindrical form could be carried out mechanically, especially if the detent is not a projecting rib or stud but an inset groove. For example an insert could thrust down within the body 2, or even the blow pin 9 might be extended to press down on the flange as it is inserted. That insert could then be withdrawn, and the final shaping achieved by blow moulding.

The sealing together of the flanges 4 and 6 affords means of secure identification when the plastics material is transparent. A band 13, indicated in broken lines in FIG. 4, can be placed around the inside of the flange 6, carrying data such as a company name, product details or a bar code to be legible through the flange 6. After blow moulding, this band will be securely sealed within the plastics material, and will be impossible to remove without destruction of the container.

Suitable plastics materials include polyvinyl chloride, high density polythene, polypropylene, or polyethylene terepthalate (P.E.T.) in either crystalline or amorphous form. It should also be possible to apply the method to glass containers, and may even by feasible with certain metals, such as aluminium.

While blow moulding is expected to be the preferred method of expansion, aided by mechanical stretching for large containers, it may be possible to achieve the same effect by suction moulding.

What is claimed is:

1. A method of making a container to which entry is via an opening having a detent (5) for positively retaining a closure member within that opening, the material of the container being susceptible to deformation when heated, characterised in that in a first stage an embryo container (1) is formed as a closed end tube (2) with an outward, generally radial flange (4, 7) at its mouth, part of the upper surface of which flange is to provide the inside of the opening, the detent (5) being simultaneously formed as a projection from or depression in said surface, and in that in a second stage the outer peripheral portion (7) of the flange is held fast while the tube (2), at an elevated temperature, is expanded by differential pressure, this drawing down and forcing outwardly the inner portion (4) of the flange and transforming said upper surface from an upwardly facing one into a passage providing the opening with the detent (5).

2. A method of making a container as claimed in claim 1, characterised in that the formation of the embryo container (1) in the first stage is by moulding in a two part mould one of which has a core subsequently extractable through said opening.

3. A method of making a container as claimed in claim 2, characterised in that the formation of the embryo container is by injection moulding.

4. A method of making a container as claimed in claim 1, characterised in that the transformation from embryo to finished container in the second stage is by blow moulding via the opening.

5. A method of making a container as claimed in claim 1, characterised in that the detent (5) in the embryo container is a spiral or part spiral to form screw threading in the finished container.

6. A method of making a container as claimed in claim 1, characterised in that the detent is at least one L-shaped indentation to form part of a bayonet fitting.

7. A method of making a container as claimed in claim 1, characterised in that the detent is at least one stud to form part of a bayonet fitting.

8. A method of making a container as claimed in claim 1, characterised in that the detent is an annular ring formation for the retention of a roller ball.

9. A method of making a container as claimed in claim 1, characterised in that the embryo container (1) has a generally cylindrical flange (6) on the radial flange (4, 7) projecting downwardly to surround the opening end of the tube (2).

10. A method of making a container as claimed in claim 9, characterised in that the under surface of the inner portion (4) of the radial flange, when that is deformed downwardly and outwardly by the tube expansion, co-operates with the inside of the cylindrical flange (6).

11. A method of making a container as claimed in claim 10, characterised in that in the finished container said under surface bonds to the cylindrical flange (6).

12. A method of making a container as claimed in claim 10, characterised in that the material of the container is transparent and a data band is provided on the inside of the cylindrical flange (6) of the embryo container to be legible therethrough, the band being made captive by the deformed portion of the radial flange (4).

13. A method of making a container as claimed in claim 10, characterised in that the transformation from embryo to finished container in the second stage is by blow moulding via the opening, and in that the outer peripheral portion of the flange is a stepped up rim projecting beyond the cylindrical flange, its underside providing means for locating the embryo container during the blow moulding while its inside provides a seat for a blow pin.

14. A container made by the method of claim 1.

* * * * *